(12) United States Patent
Bell

(10) Patent No.: US 11,654,980 B2
(45) Date of Patent: May 23, 2023

(54) BRACKET SUPPORT SYSTEM FOR A TRACTOR HOIST

(71) Applicant: Jerry Bell, Silver Creek, NE (US)

(72) Inventor: Jerry Bell, Silver Creek, NE (US)

( * ) Notice: Subject to any disclaimer, the term of this patent is extended or adjusted under 35 U.S.C. 154(b) by 834 days.

(21) Appl. No.: 16/595,649

(22) Filed: Oct. 8, 2019

(65) Prior Publication Data
US 2021/0101649 A1    Apr. 8, 2021

(51) Int. Cl.
| | | |
|---|---|---|
| *B62D 49/06* | (2006.01) | |
| *B66C 23/44* | (2006.01) | |
| *B60D 1/48* | (2006.01) | |
| *B66C 23/00* | (2006.01) | |
| *B60D 1/46* | (2006.01) | |
| *B66C 23/62* | (2006.01) | |
| *B60D 1/00* | (2006.01) | |

(52) U.S. Cl.
CPC .............. *B62D 49/065* (2013.01); *B60D 1/46* (2013.01); *B60D 1/48* (2013.01); *B66C 23/44* (2013.01); *B66C 23/54* (2013.01); *B66C 23/62* (2013.01); *B60D 2001/008* (2013.01)

(58) Field of Classification Search
CPC .......... B62D 49/065; B60D 1/46; B60D 1/48; B60D 2001/008; B66C 23/44; B66C 23/54; B66C 23/62
See application file for complete search history.

(56) References Cited

U.S. PATENT DOCUMENTS

| | | | | |
|---|---|---|---|---|
| 4,226,331 A | * | 10/1980 | Dumond ................ | B66C 23/44 212/258 |
| 5,211,526 A | * | 5/1993 | Robinette .............. | B66C 23/48 414/718 |
| 5,749,697 A | * | 5/1998 | Davis ..................... | B66F 9/061 212/253 |
| 6,030,170 A | * | 2/2000 | Lewis .................... | B66C 23/44 414/703 |
| 10,595,526 B1 | * | 3/2020 | Imm .................... | A01M 31/006 |
| D881,078 S | * | 4/2020 | Rebick .................. | B60D 1/58 D12/162 |
| 10,822,209 B1 | * | 11/2020 | Horton .................... | B66F 9/06 |

(Continued)

OTHER PUBLICATIONS

AgTalk online blog post from jimmcpet, plow79, chris924 for thread post titled: "highway dump trailer convert to use farm tractor to pull grain" dated Dec. 28, 2013-Dec. 28, 2013, weblink: https:// talk.newagtalk.com/forums/thread-view.asp?tid=440889&DisplayType= nested&setCookie=1 (Year: 2013).*

(Continued)

*Primary Examiner* — Terrell L McKinnon
*Assistant Examiner* — Ding Y Tan
(74) *Attorney, Agent, or Firm* — The Iwashko Law Firm, PLLC; Lev Ivan Gabriel Iwashko

(57) ABSTRACT

A bracket support system to connect a hoist to a connector rod and at least one hoist connector of a tractor, the bracket support system including an upper mask bracket removably disposed on a mounting mask to connect to the connector rod, at least one lower bracket removably disposed on a rear of the hoist, a stiffener bracket disposed on at least a portion of the hoist to prevent damage to the mounting mask in response to lifting at least one object on the hoist, and a support shaft disposed within at least a portion of the rear of the hoist.

5 Claims, 7 Drawing Sheets

(56) References Cited

U.S. PATENT DOCUMENTS

| | | | | |
|---|---|---|---|---|
| 11,007,832 | B1* | 5/2021 | Rebick | B60D 1/52 |
| 2001/0043852 | A1* | 11/2001 | Maxwell | B60P 1/54 |
| | | | | 414/462 |
| 2014/0224941 | A1* | 8/2014 | Gitter | F16L 3/01 |
| | | | | 248/68.1 |
| 2014/0294540 | A1* | 10/2014 | Shaw | E04F 21/1872 |
| | | | | 414/732 |
| 2017/0028810 | A1* | 2/2017 | Feldhake | B60P 3/20 |
| 2020/0100486 | A1* | 4/2020 | McMenamy | B63B 17/00 |
| 2021/0094370 | A1* | 4/2021 | McAllister | B60D 1/248 |
| 2021/0235608 | A1* | 8/2021 | Kelly | B66C 23/166 |

OTHER PUBLICATIONS

Farm Show magazine article titled "Rolling Engine Hoist Converted To 3-Pt. Mounted Crane" vol. 24, Issue 5, 2000, (hereinafter referred to as "Farm Show") (Year: 2000).*
Skid-Lift tractor scissor lift attachment kit web page from http://skid-lift.com / internet archive archive.org dated; Jan. 6, 2019, http://skid-lift.com/tractors/ (Year: 2019).*
Strongway Hydraulic Engine Hoist with Load Leveler product page https://www.amazon.com/Strongway-Hydraulic-Engine-Hoist-Leveler/dp/B00TIN4W7W (Year: 2015).*
Ecotric 3-Point trailer hitch tractor tow drawbar pull sold on amazon.com, dated Oct. 10, 2016 https://www.amazon.com/Receiver-Trailer-Category-1Tractor-Drawbar/dp/B01M3NP10L (Year: 2016).*
Bradco quick attach to 3 point adapter youtube video dated Feb. 18, 2011, https://www.youtube.com/watch?v=-Z-Zke-iLx0 (Year: 2011).*

* cited by examiner

BRACKET SUPPORT SYSTEM FOR A TRACTOR HOIST

BACKGROUND

1. Field

The present general inventive concept relates generally to a bracket support system, and particularly, to a bracket support system for a tractor hoist.

2. Description of the Related Art

A tractor is a type of vehicle used in both farming and construction. The tractor offers high torque to move itself, as well as, any object connected to it, such as a hoist or a trailer.

Unfortunately, many farmers and construction workers use tractors that are unable to move larger and bulky items. As such, farmers and construction workers cannot perform their jobs effectively and may even require additional types of equipment. Sometimes, a forklift may be needed, which can be inconvenient, due to a necessity of reserving a forklift and needing to accommodate more space for the forklift.

Therefore, there is a need for a bracket support system for a tractor hoist, such that the tractor hoist can be connected to the tractor to lift items while conserving space for equipment.

SUMMARY

The present general inventive concept provides a bracket support system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a bracket support system to connect a hoist to a connector rod and at least one hoist connector of a tractor, the bracket support system including an upper mast bracket removably disposed on a mounting mast to connect to the connector rod, at least one lower bracket removably disposed on a rear of the hoist, a stiffener bracket disposed on at least a portion of the hoist to prevent damage to the mounting mast in response to lifting at least one object on the hoist, and a support shaft disposed within at least a portion of the rear of the hoist.

The at least one lower bracket may receive the at least one hoist connector therein, such that the at least one lower bracket may move the hoist in response to movement of the tractor.

The support shaft may receive the at least one hoist connector thereupon, such that the support shaft may move the hoist in response to movement of the tractor.

The stiffener bracket may prevent the mounting mast from bending.

The bracket support system may further include at least one hydraulic cylinder disposed on at least a portion of the mounting mast to move a boom on the hoist in response to movement of the hydraulic cylinder.

The foregoing and/or other features and utilities of the present general inventive concept may also be achieved by providing a bracket support system to connect a trailer to a tractor, the bracket support system including a plurality of mast brackets disposed on at least a portion of the trailer to connect to a hitch, each of the plurality of mast brackets including a first portion, and a second portion disposed in parallel to the first portion, such that at least one fastener may connect to the first portion and the second portion.

The plurality of mast brackets may facilitate the hitch pivoting in a direction from down in a first position to at least partially up in a second position.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
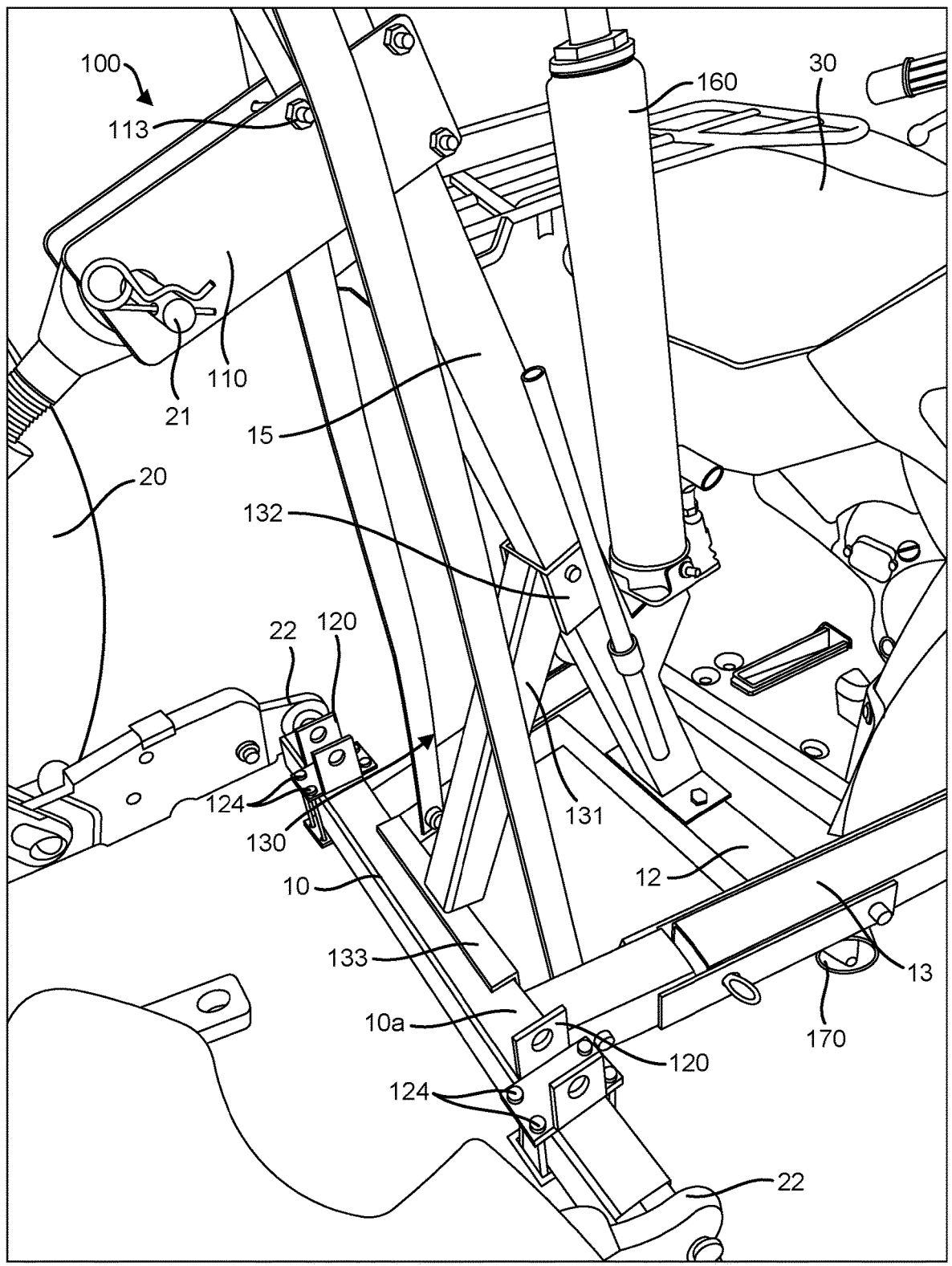
FIG. 1A illustrates a top isometric perspective view of a bracket support system disposed on a hoist as disposed on a tractor, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Bracket Support System 100
Upper Mast Bracket 110
First Portion 111
First Body 111a
First Connector-Receiving Aperture 111b
Fastener-Receiving Apertures 111c
Second Portion 112
Second Body 112a
Second Connector-Receiving Aperture 112b
Fastener-Receiving Apertures 112c
Fasteners 113
Lower Brackets 120
Top Portion 121
Top Body 121a
Fastener-Receiving Apertures 121b
Bottom Portion 122
Bottom Body 122a
Fastener-Receiving Apertures 122b
Vertical Portions 123
Vertical Body 123a
Third Connector-Receiving Aperture 123b
Fasteners 124
Stiffener Bracket 130
Stiffener Body 131
Mast-Receiving End 132
Bottom-Receiving End 133
Support Shaft 140
Rod-Receiving Tube 141
Rod Tips 142
Rod 143
Support Plate 150
Support Body 151
Fastener-Receiving Apertures 152
Fasteners 153
Hydraulic Cylinder 160
Wheels 170
Bracket Support System 200
Mast Brackets 210
First Portion 211
First body 211a
Fastener-Receiving Apertures 211b
Second Portion 212
Second Body 212a
Fastener-Receiving Apertures 212b
Fasteners 213

FIG. 1A illustrates a top isometric perspective view of a bracket support system 100 disposed on a hoist 10 as disposed on a tractor 20, according to an exemplary embodiment of the present general inventive concept.

Figure 1B:
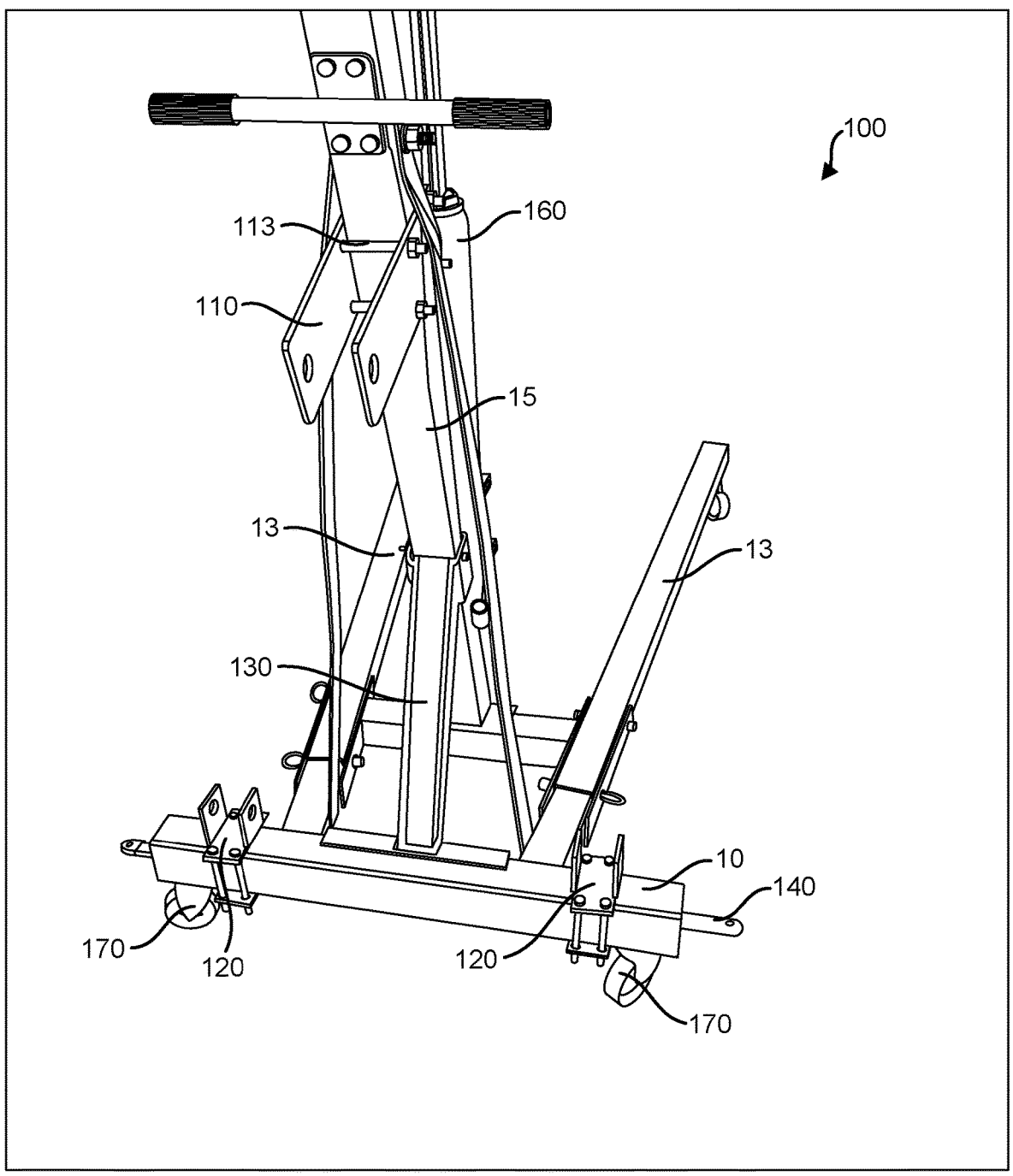
FIG. 1B illustrates a rear perspective view of the bracket support system disposed on the hoist, according to an exemplary embodiment of the present general inventive concept.
Figure 1C:
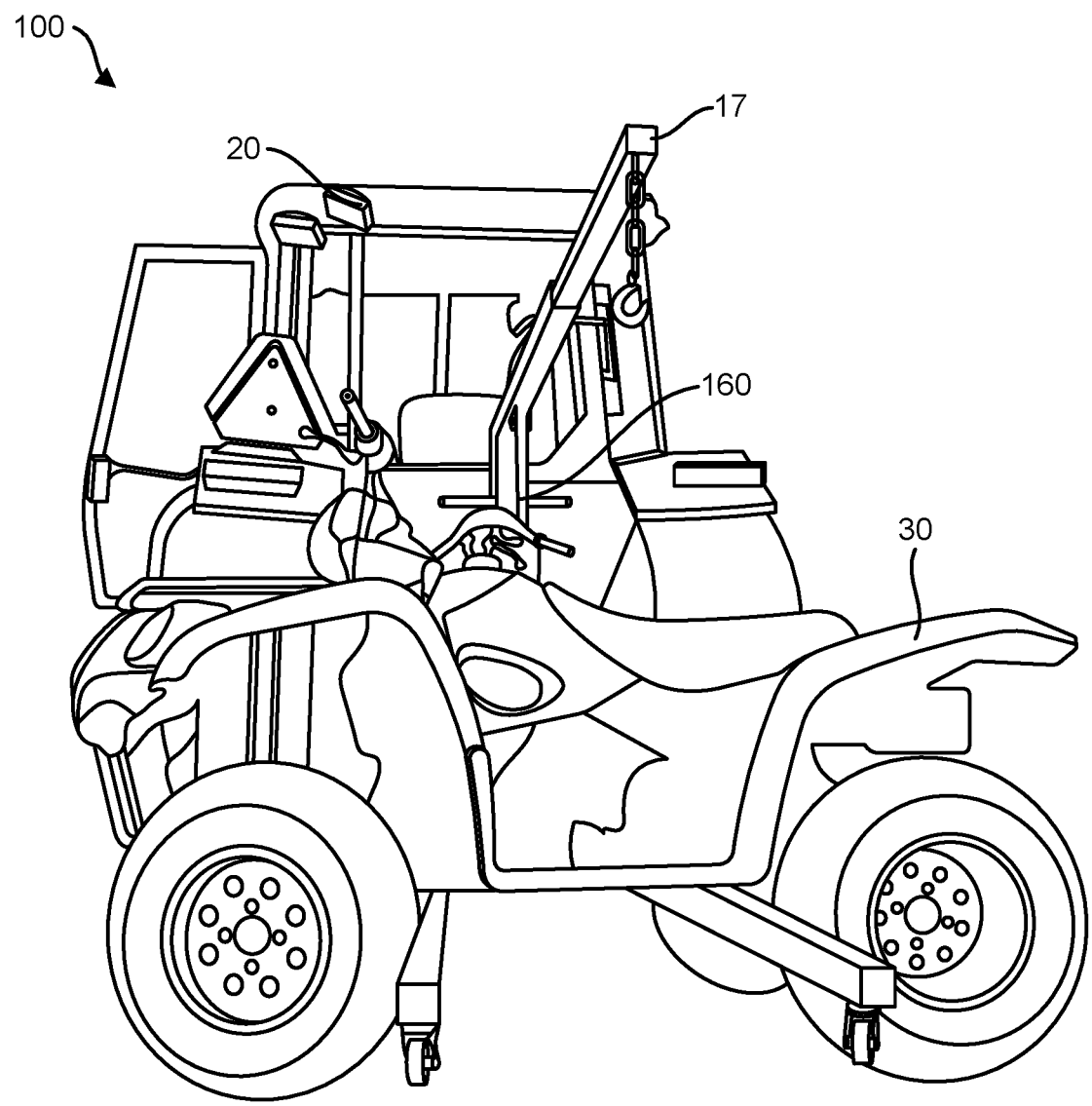
FIG. 1C illustrates a front perspective view of the bracket support system disposed on the hoist as disposed on the tractor, according to an exemplary embodiment of the present general inventive concept.

FIG. 1B illustrates a rear perspective view of the bracket support system 100 disposed on the hoist 10, according to an exemplary embodiment of the present general inventive concept.

FIG. 10 illustrates a front perspective view of the bracket support system 100 disposed on the hoist 10 as disposed on the tractor 20, according to an exemplary embodiment of the present general inventive concept.

The bracket support system 100 may be constructed from at least one of metal, plastic, wood, ceramic, and rubber, etc., but is not limited thereto.

Referring to FIGS. 1A through 10, the bracket support system 100 may stabilize the hoist 10 while at least one first object 30 is disposed on the hoist 10.

Figure 2:
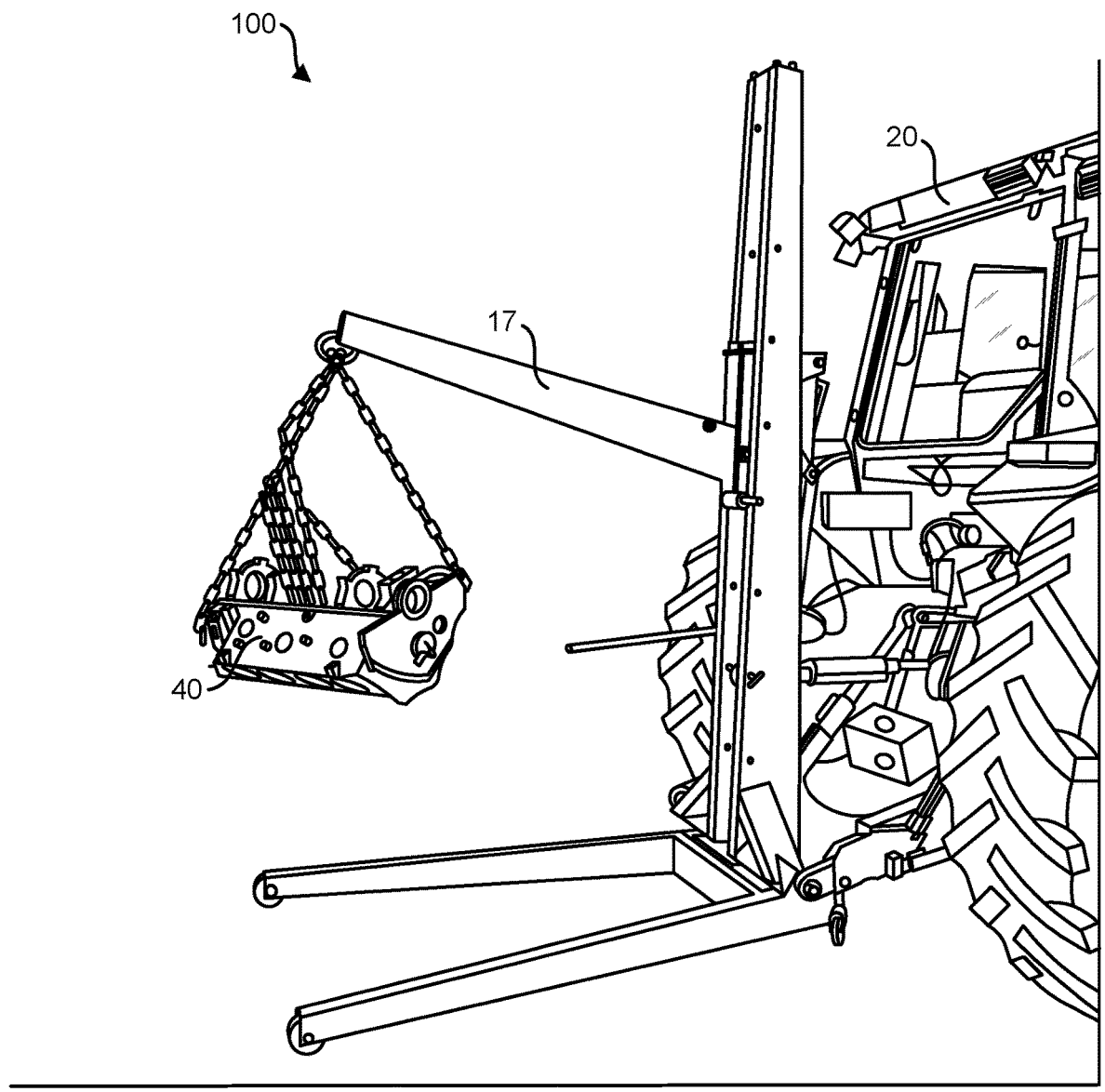
FIG. 2 illustrates a side perspective view of the bracket support system disposed on the hoist, according to an exemplary embodiment of the present general inventive concept.

FIG. 2 illustrates a side perspective view of the bracket support system 100 disposed on the hoist 10, according to an exemplary embodiment of the present general inventive concept.

Alternatively, the bracket support system 100 may stabilize the hoist 10 while at least one second object 40 is suspended on a boom 17 of the hoist 10.

Figure 3A:
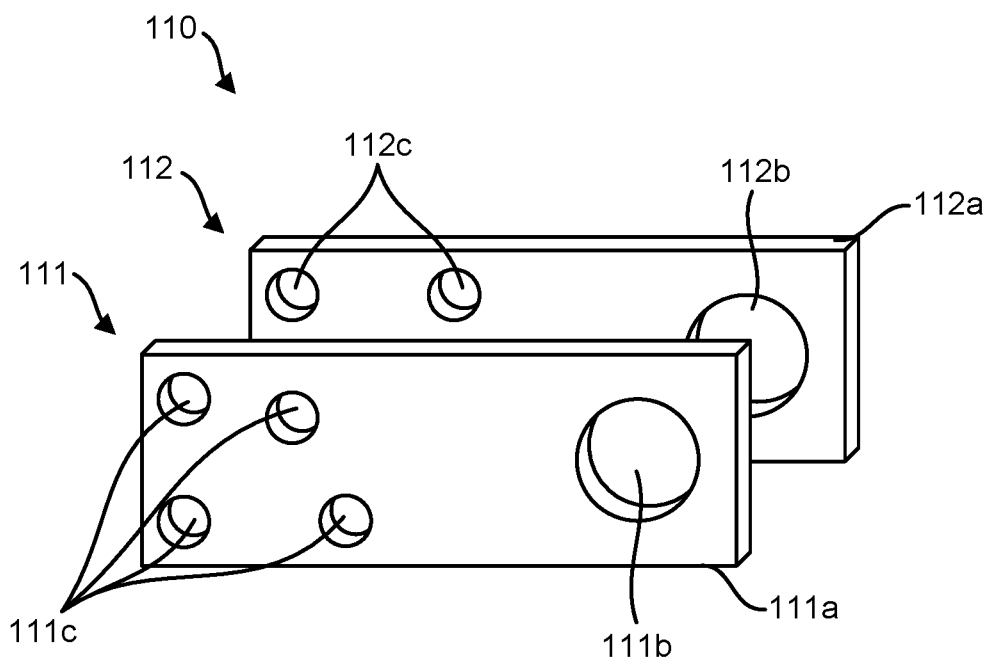
FIG. 3A illustrates a side perspective view of an upper mast bracket, according to an exemplary embodiment of the present general inventive concept.

FIG. 3A illustrates a side perspective view of an upper mast bracket 110, according to an exemplary embodiment of the present general inventive concept.

Figure 3B:
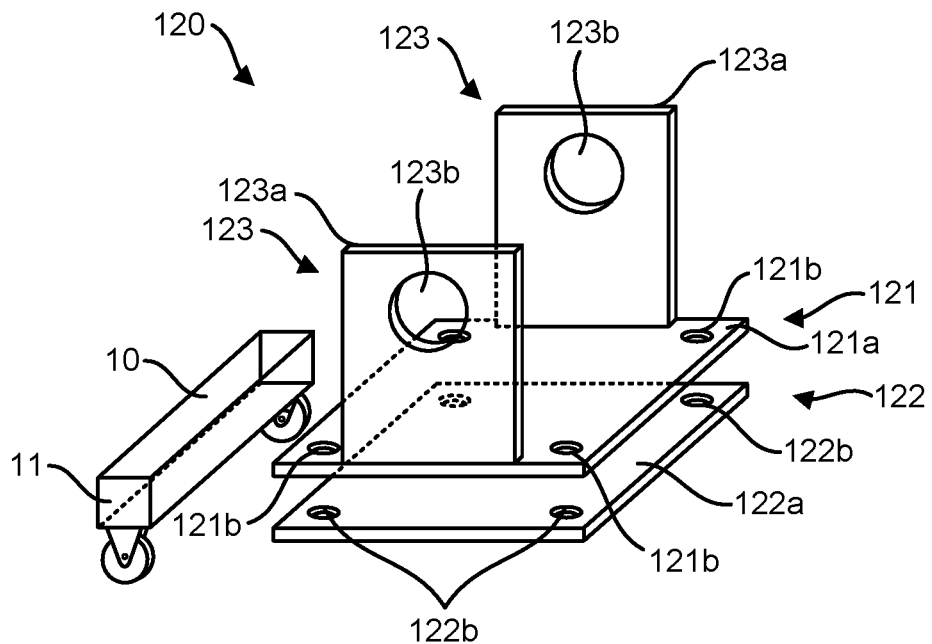
FIG. 3B illustrates a side perspective view of a lower bracket, according to an exemplary embodiment of the present general inventive concept.

FIG. 3B illustrates a side perspective view of a lower bracket 120, according to an exemplary embodiment of the present general inventive concept.

Figure 3C:
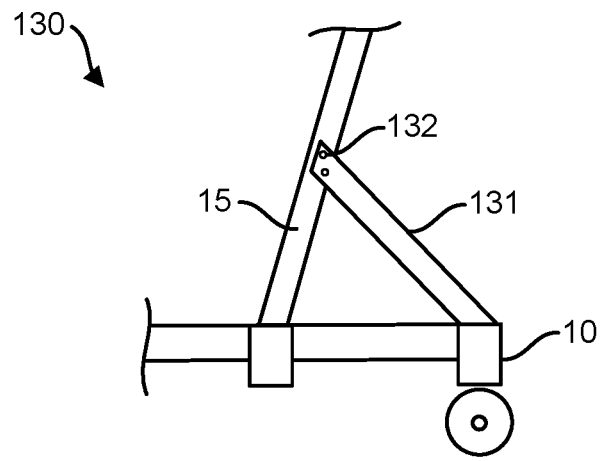
FIG. 3C illustrates a side view of a stiffener bracket, according to an exemplary embodiment of the present general inventive concept.

FIG. 3C illustrates a side view of a stiffener bracket 130, according to an exemplary embodiment of the present general inventive concept.

Figure 3D:
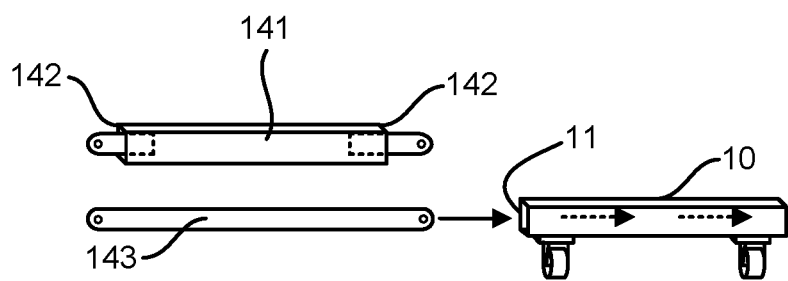
FIG. 3D illustrates a side view of a support shaft, according to an exemplary embodiment of the present general inventive concept.

FIG. 3D illustrates a side view of a support shaft 140, according to an exemplary embodiment of the present general inventive concept.

Figure 3E:
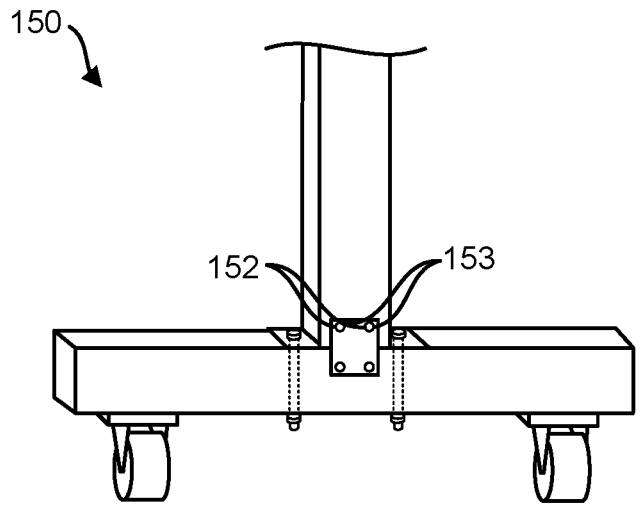
FIG. 3E illustrates a front perspective view of a support plate, according to an exemplary embodiment of the present general inventive concept.

FIG. 3E illustrates a front perspective view of a support plate 150, according to an exemplary embodiment of the present general inventive concept.

The bracket support system 100 may include an upper mast bracket 110, a plurality of lower brackets 120, a stiffener bracket 130, a support shaft 140, a support plate 150, at least one hydraulic cylinder 160, and a plurality of wheels 170, but is not limited thereto.

Referring to FIGS. 1A and 3A, the upper mast bracket 110 may include a first portion 111, a second portion 112, and a plurality of fasteners 113, but is not limited thereto.

The first portion 111 may include a first body 111a, a first connector-receiving aperture 111b, and a plurality of fastener-receiving apertures 111c, but is not limited thereto.

The second portion 112 may include a second body 112a, a second connector-receiving aperture 112b, and a plurality of fastener-receiving apertures 112c, but is not limited thereto.

The plurality of fasteners 113 may include a twine, a string, a rope, a magnet, a clasp, a hook, a screw, a nail, a bolt, a nut, a washer, and/or any combination thereof, but is not limited thereto.

Referring to FIG. 1A, the first body 111a and the second body 112a may be removably disposed around at least a portion of a mounting mast 15 of the hoist 10. Specifically, each of the plurality of fastener-receiving apertures 111c of the first portion 111 may be aligned corresponding to each of the plurality of fastener-receiving apertures 112c of the second portion 112, such that each of the plurality of fasteners 113 may be inserted into each of the plurality of fastener-receiving apertures 111c and each of the plurality of fastener-receiving apertures 112c.

Similarly, the first connector-receiving aperture 111b may be aligned corresponding to the second connector-receiving aperture 112b, such that a connector rod 21 of the tractor 20 may be inserted through the first connector-receiving aperture 111b and the second connector-receiving aperture 112b.

As such, the upper mast bracket 110 may be disposed on the mounting mast 15 to connect to the connector rod 21.

Referring to FIG. 3B, each of the plurality of lower brackets 120 may include a top portion 121, a bottom portion 122, a plurality of vertical portions 123, and a plurality of fasteners 124, but is not limited thereto.

The top portion 121 may include a top body 121a and a plurality of fastener-receiving apertures 121b, but is not limited thereto.

The bottom portion 122 may include a bottom body 122a and a plurality of fastener-receiving apertures 122b, but is not limited thereto.

The plurality of fasteners 124 may include a twine, a string, a rope, a magnet, a clasp, a hook, a screw, a nail, a bolt, a nut, a washer, and/or any combination thereof, but is not limited thereto.

Referring again to FIG. 1A, the top body 121a and the bottom body 122a may be removably disposed around at least a portion of a rear 10a of the hoist 10. Specifically, each of the plurality of fastener-receiving apertures 121a of the top portion 121 may be aligned corresponding to each of the plurality of fastener-receiving apertures 122b of the bottom portion 122, such that each of the plurality of fasteners 124 may be inserted into each of the plurality of fastener-receiving apertures 121b and each of the plurality of fastener-receiving apertures 122b.

Each of the plurality of vertical portions 123 may include a vertical body 123a and a third connector-receiving aperture 123b, but is not limited thereto.

The vertical body 123a may be perpendicularly disposed away from a top surface of the top portion 121. Additionally, each of the plurality of vertical portions 123 may be in parallel to each other. Moreover, the third connector-receiving aperture 123b may be aligned with another third connector-receiving aperture 123b.

As such, each of a plurality of hoist connectors 22 of the tractor 20 may be disposed between each of the plurality of vertical portions 123. Furthermore, each of the plurality of vertical portions 123 via the third connector-receiving aperture 123b and each of the plurality of hoist connectors 22 of the tractor 20 may receive another connector rod 21 therethrough. In other words, the another connector rod 21 may be inserted through each third connector-receiving aperture 123b and each of the plurality of hoist connectors 22, such that the plurality of lower brackets 120 move the hoist 10 in response to movement of the tractor 20.

As such, the upper mast bracket 110 and the plurality of lower brackets 120 may facilitate a connection between the hoist 10 and the tractor 20, such that the tractor 20 may move and/or lift the hoist 10.

Referring to FIGS. 1A and 3C, the stiffener bracket 130 may include a stiffener body 131, a mast-receiving end 132, and a bottom-receiving end 133, but is not limited thereto.

The stiffener body 131 may be disposed between the rear 10a of the hoist 10 and the mounting mast 15 of the hoist 10. More specifically, the mast-receiving end 132 may be removably connected to at least a portion of the mounting mast 15 of the hoist 10 by the mast-receiving end 132, and at least a portion of the rear 10a of the hoist 10 by the bottom-receiving end 133.

Referring again to FIG. 1A, the stiffener body 131 may prevent damage to the mounting mast 15 in response to movement of the hoist 10. In other words, the stiffener body 131 may prevent the mounting mast 15 from bending due to stress applied to an intermediary section 12 and at least one arm 13 of the hoist 10 in response to lifting the at least one first object 30.

For example the upper mast bracket 110, the plurality of lower brackets 120, and the stiffener bracket 130 may support the hoist 10 lifting a weight of up to two tons, but is not limited thereto. In other words, the upper mast bracket 110, the plurality of lower brackets 120, and the stiffener bracket 130 may support heavier weights.

The support shaft 140 may include a rod-receiving tube 141, a plurality of rod tips 142, and a rod 143, but is not limited thereto.

Referring to FIGS. 1A, 1B, and 3D, at least one of the plurality of rod tips 142 may be disposed (i.e. welded) to each end of the rod-receiving tube 141. The rod-receiving tube 141 may be inserted into at least a portion of a shaft-receiving aperture 11 of the hoist 10. Moreover, each of the plurality of rod tips 142 may extend out from the shaft-receiving aperture 11.

As such, each of the plurality of hoist connectors 22 of the tractor 20 may be disposed on each of the plurality of rod tips 142. More specifically, each of the plurality of rod tips 142 may be inserted through each of the plurality of hoist connectors 22.

Alternatively, the rod 143 may be inserted into the rod-receiving tube 141, such that the rod-receiving tube 141 may be inserted into the shaft-receiving aperture 11 of the hoist 10. Moreover, each end of the rod 143 may extend out from the shaft-receiving aperture 11, such that each of the plurality of hoist connectors 22 of the tractor 20 may be disposed on each end of the rod 143.

As such, each of the plurality of hoist connectors 22 of the tractor 20 may be disposed on each end of the rod 143. More specifically, each end of the rod 143 may be inserted through each of the plurality of hoist connectors 22.

Alternatively, the rod 143 may be inserted directly into the shaft-receiving aperture 11 of the hoist 10, such that the rod 143 may connect to each of the plurality of hoist connectors 22, as described above. As such, the support shaft 140 may move the hoist 10 in response to movement of the tractor 20.

The support plate 150 may include a support body 151, a plurality of fastener-receiving apertures 152, and a plurality of fasteners 153, but is not limited thereto.

The plurality of fasteners 153 may include a twine, a string, a rope, a magnet, a clasp, a hook, a screw, a nail, a bolt, a nut, a washer, and/or any combination thereof, but is not limited thereto.

The support body 151 may be removably connected to at least a portion of the rear 10a of the hoist 10 and at least a portion of the stiffener bracket 130. More specifically, each of the plurality of fasteners 153 may be inserted into each of the plurality of fastener-receiving apertures 152, such that the support body 151 may be prevented from moving away from the rear 10a of the hoist 10 and the stiffener bracket 130.

As such, the support plate 150 may stabilize the stiffener bracket 130 to the hoist 10.

The at least one hydraulic cylinder 160 may be disposed along at least a portion of the mounting mast 15. The at least one hydraulic cylinder 160 may raise the boom 17, such that the at least one second object 40 may move in response to movement of the boom 17.

The plurality of wheels 170 may be disposed on at least a portion of a bottom surface of the hoist 10 to facilitate movement. More specifically, the plurality of wheels 170 may roll across a planar surface, such as a ground surface, in response to a force applied to the hoist 10, while the hoist 10 is disposed on the planar surface.

Therefore, the bracket support system 100 may facilitate using the hoist 10 on the tractor 20 to lift the at least one first object 30 and/or the at least one second object 40. Additionally, the bracket support system 100 may eliminate a need to use alternative vehicles, such as a forklift. As such, the bracket support system 100 may save storage space due to eliminating the need of using alternative vehicles.

Figure 4A:
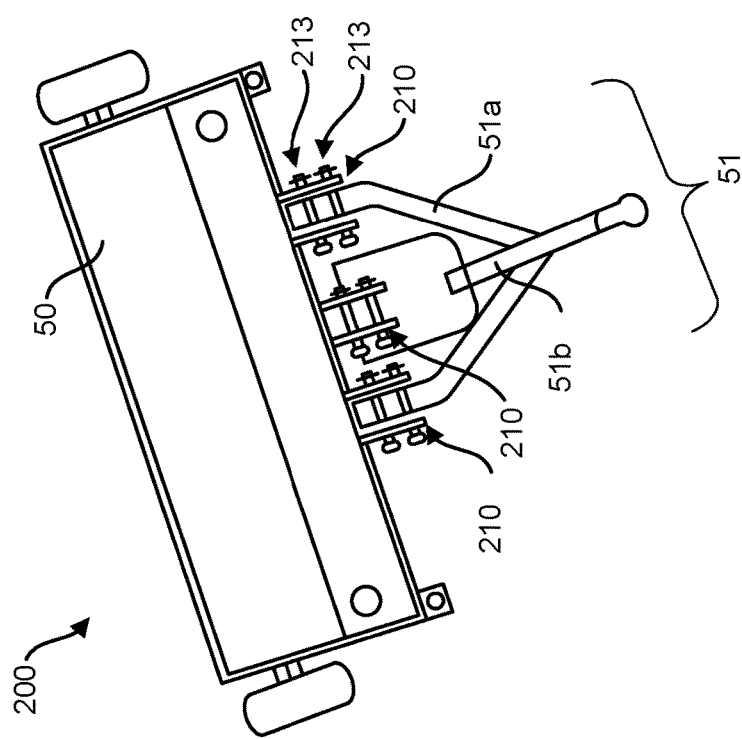
FIG. 4A illustrates a top view of a bracket support system, according to another exemplary embodiment of the present general inventive concept.

FIG. 4A illustrates a top view of a bracket support system 200, according to another exemplary embodiment of the present general inventive concept.

Figure 4B:
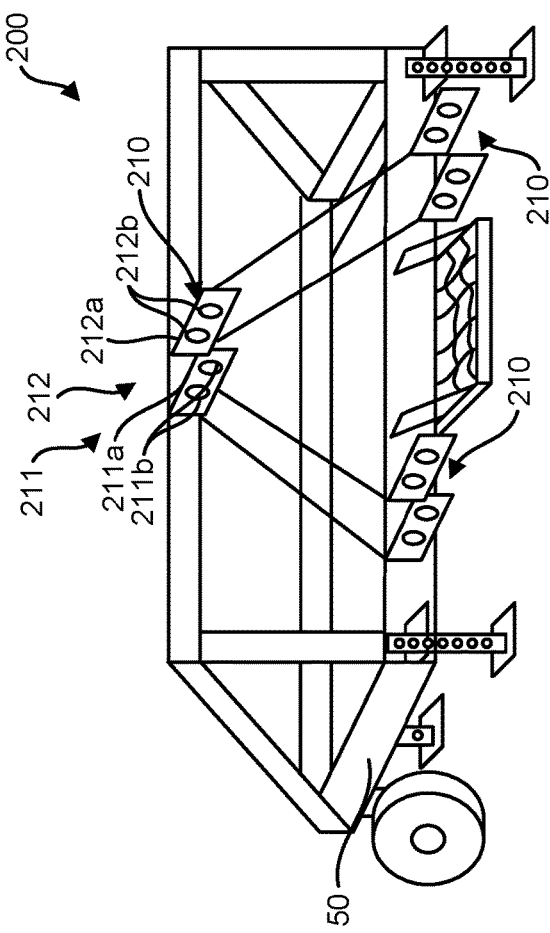
FIG. 4B illustrates a front perspective view of the bracket support system, according to another exemplary embodiment of the present general inventive concept.

FIG. 4B illustrates a front perspective view of the bracket support system 200, according to another exemplary embodiment of the present general inventive concept.

The bracket support system 200 may be constructed from at least one of metal, plastic, wood, ceramic, and rubber, etc., but is not limited thereto.

The bracket support system 200 may facilitate a connection of a trailer 50 to the tractor 20.

Referring to FIGS. 4A and 4B, the bracket support system 200 may include a plurality of mast brackets 210, but is not limited thereto.

Each of the plurality of mast brackets 210 may include a first portion 211, a second portion 212, and a plurality of fasteners 213, but is not limited thereto.

The first portion 211 may include a first body 211a and a plurality of fastener-receiving apertures 211b, but is not limited thereto.

The second portion 212 may include a second body 212a and a plurality of fastener-receiving apertures 212b, but is not limited thereto.

The plurality of fasteners 213 may include a twine, a string, a rope, a magnet, a clasp, a hook, a screw, a nail, a bolt, a nut, a washer, and/or any combination thereof, but is not limited thereto.

Referring again to FIGS. 4A and 4B, the first body 211a and the second body 212a may be removably disposed on at least a portion of the trailer 50. Specifically, the first body 211a and the second body 212a may disposed on the trailer 50 using a magnet, an adhesive, and/or any other fastener. Also, each of the plurality of fastener-receiving apertures 211b of the first portion 211 may be aligned corresponding to each of the plurality of fastener-receiving apertures 212b of the second portion 212, such that each of the plurality of fasteners 213 may be inserted into each of the plurality of fastener-receiving apertures 211b and each of the plurality of fastener-receiving apertures 212b.

Furthermore, the plurality of fasteners 213 may be connected to a hitch 51 of the trailer 50. More specifically, a lower section 51a and an upper section 51b may be connected to the plurality of mast brackets 210. Moreover, the lower section 51a and the upper section 51b may pivot via the plurality of fasteners 213. In other words, the hitch 51 may move from down in a first position to at least partially up in a second position.

As such, the plurality of mast brackets 210 may connect the trailer 50 to the tractor 20 via the hitch 51.

The present general inventive concept may include a bracket support system 100 to connect a hoist 10 to a connector rod 21 and at least one hoist connector 22 of a tractor 20, the bracket support system 100 including an upper mast bracket 110 removably disposed on a mounting mast 15 to connect to the connector rod 21, at least one lower bracket 120 removably disposed on a rear 10a of the hoist 10, a stiffener bracket 130 disposed on at least a portion of the hoist 10 to prevent damage to the mounting mast 15 in response to lifting at least one object on the hoist 10, and a support shaft 140 disposed within at least a portion of the rear 10a of the hoist 10.

The at least one lower bracket 120 may receive the at least one hoist connector 22 therein, such that the at least one lower bracket 120 may move the hoist 10 in response to movement of the tractor 20.

The support shaft 140 may receive the at least one hoist connector 22 thereupon, such that the support shaft 140 may move the hoist 10 in response to movement of the tractor 20.

The stiffener bracket 130 may prevent the mounting mast 15 from bending.

The bracket support system 100 may further include at least one hydraulic cylinder 160 disposed on at least a portion of the mounting mast 15 to move a boom 17 on the hoist 10 in response to movement of the hydraulic cylinder 160.

The present general inventive concept may also include a bracket support system 200 to connect a trailer 50 to a tractor 20, the bracket support system 200 including a plurality of mast brackets 210 disposed on at least a portion of the trailer 50 to connect to a hitch 51, each of the plurality of mast brackets 210 including a first portion 211, and a second portion 212 disposed in parallel to the first portion 211, such that at least one fastener 213 may connect to the first portion 211 and the second portion 212.

The plurality of mast brackets 210 may facilitate the hitch 51 pivoting in a direction from down in a first position to at least partially up in a second position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A bracket support system to connect a hoist to a connector rod and at least one hoist connector of a tractor, the bracket support system comprising:
    an upper mast bracket removably disposed on a mounting mast to connect to the connector rod, the upper mast bracket comprising:

a first portion comprising a first connector-receiving aperture, the first portion removably disposed on a first side of the mounting mast, and a second portion comprising a second connector-receiving aperture removably disposed on a second side of the mounting mast to receive a plurality of fasteners within a plurality of fastener-receiving apertures to connect the second portion to the first portion, such that the first connector-receiving aperture and the second connector-receiving aperture receive the connector rod therethrough, such that a diameter of the first connector-receiving aperture and a diameter of the second connector-receiving aperture are larger than a diameter of each of the plurality of fastener-receiving apertures;

at least one lower bracket removably disposed on a rear of the hoist;

a stiffener bracket disposed on at least a portion of the hoist to prevent damage to the mounting mast in response to lifting at least one object on the hoist; and a support shaft disposed within at least a portion of the rear of the hoist.

2. The bracket support system of claim 1, wherein the at least one lower bracket receives the at least one hoist connector therein, such that the at least one lower bracket moves the hoist in response to movement of the tractor.

3. The bracket support system of claim 1, wherein the support shaft receives the at least one hoist connector thereupon, such that the support shaft moves the hoist in response to movement of the tractor.

4. The bracket support system of claim 1, wherein the stiffener bracket prevents the mounting mast from bending.

5. The bracket support system of claim 1, further comprising:

at least one hydraulic cylinder disposed on at least a portion of the mounting mast to move a boom on the hoist in response to movement of the hydraulic cylinder.

* * * * *